(12) United States Patent
Hagendorf

(10) Patent No.: US 8,208,410 B1
(45) Date of Patent: Jun. 26, 2012

(54) SYSTEMS AND METHODS FOR IMPLEMENTING CALL WAITING IN MULTIMEDIA DEVICES

(75) Inventor: Pierre Hagendorf, Ra'anana (IL)

(73) Assignee: Radvision Ltd., Tel Aviv (IL)

( * ) Notice: Subject to any disclaimer, the term of this patent is extended or adjusted under 35 U.S.C. 154(b) by 422 days.

(21) Appl. No.: 11/068,327

(22) Filed: Feb. 28, 2005

(51) Int. Cl.
*H04L 12/16* (2006.01)
*H04L 12/66* (2006.01)
*H04M 3/42* (2006.01)

(52) U.S. Cl. ... 370/259; 370/352; 370/353; 379/211.01; 379/215.01

(58) Field of Classification Search .......................... None
See application file for complete search history.

(56) References Cited

U.S. PATENT DOCUMENTS

| | | | |
|---|---|---|---|
| 3,377,433 A | 4/1968 | Whitney | |
| 3,997,731 A | 12/1976 | Wilmot et al. | |
| 5,805,587 A * | 9/1998 | Norris et al. | 370/352 |
| 5,894,504 A * | 4/1999 | Alfred et al. | 379/88.13 |
| 5,974,131 A | 10/1999 | Malik | |
| 6,493,445 B2 * | 12/2002 | Garland et al. | 379/243 |
| 6,633,635 B2 * | 10/2003 | Kung et al. | 379/215.01 |
| 6,816,469 B1 * | 11/2004 | Kung et al. | 370/260 |
| 6,842,448 B1 * | 1/2005 | Norris et al. | 370/352 |
| 7,062,548 B1 * | 6/2006 | Peres | 709/223 |
| 7,260,205 B1 * | 8/2007 | Murphy et al. | 379/215.01 |
| 2003/0043740 A1 * | 3/2003 | March et al. | 370/229 |
| 2006/0112400 A1 * | 5/2006 | Zhang et al. | 719/328 |

* cited by examiner

*Primary Examiner* — Ayaz Sheikh
*Assistant Examiner* — Sori Aga
(74) *Attorney, Agent, or Firm* — Byrne Poh LLP

(57) ABSTRACT

A media portal is provided that is used to connect multimedia devices to other multimedia devices and content servers. When a call directed to a multimedia device busy in a call with the media portal is received, the media portal can provide a call waiting indication to the busy multimedia device without breaking the connection that is making the device busy. For example, if a first multimedia device is connected through the media portal to a content server providing streaming content of a football match, when a second device attempts to place a call to the first device, the media portal can provide a call waiting alert to the first device as part of, or as a substitute for, the delivery of the football match. Additionally the media portal can provide for the eventual connection of both devices while the previous call is still active.

11 Claims, 3 Drawing Sheets

SYSTEMS AND METHODS FOR IMPLEMENTING CALL WAITING IN MULTIMEDIA DEVICES

BACKGROUND OF THE INVENTION

The present invention relates to implementing call waiting in multimedia devices. More particularly, the present invention relates to implementing call waiting in multimedia devices, such as so-called third generation (3G) mobile telephones, so that users using multimedia features of the devices can be alerted to incoming calls.

In recent years, much excitement has developed regarding the prospects for mobile communication systems with multimedia capability. For example, there is a great deal of public interest in the notion of a mobile telephone capable of transmitting and receiving both video and audio in real time—i.e., a mobile videophone. These mobile telephones have been referred to as third generation (3G) mobile telephones.

One problem with current designs for third generation mobile telephone systems is that when a user is involved in a multimedia call like a circuit switched H.324M based videotelephony call to another 3G user or to a content delivery portal, it is not possible for the user to receive a call waiting alert that another user is attempting to place a call to the first user (this is primarily due to the fact the phones are not capable of holding more than one call when holding a multimedia call—unlike the case with voice only calls). Instead, the second user is redirected to the first user's mailbox. If the first user is on a long call, or receiving streaming content of a football match, for example, the user might miss an important call he was interested in answering.

Thus, it is desirable to provide systems and method for implementing call waiting in multimedia devices.

SUMMARY OF THE INVENTION

In accordance with the present invention, systems and methods for implementing call waiting in multimedia devices are provided. More particularly, a media portal is used to connect the multimedia devices to other multimedia devices and content servers. When a call directed to a busy multimedia device is received, the media portal can provide a call waiting indication to the busy multimedia device without breaking the connection that is making the device busy. For example, if a first multimedia device is connected through the media portal to a content server providing streaming content of a football match, when a second device attempts to place a call to the first device, the media portal can provide the call waiting alert to the first device as part of, or as a substitute for, the delivery of the football match.

In accordance with one embodiment of the present invention, a method for implementing call waiting in a multimedia device is provided. This method includes: detecting that a second device is attempting to place a call to the first multimedia device that is engaged in a multimedia call; generating a call-waiting alert at the media portal; and providing the call-waiting alert to the first multimedia device. Additionally, in a further embodiment, the method also connects multiple sources to the first multimedia device.

In accordance with another embodiment of the present invention a system for implementing call waiting is provided. This system includes a communication network, a first multimedia device connected to the communication network, and a second device attempting to place a call to the first multimedia device. The system also includes a media portal that connects the first multimedia device to a source of multimedia content, that receives an indication that the second device is attempting to place the call to the first multimedia device, and that generates a call-waiting alert to the first multimedia device. In a further embodiment, the media portal also provides for connecting, selecting and switching between the two or more multimedia communications peers.

BRIEF DESCRIPTION OF THE INVENTION

The present invention is described in further detail in conjunction with the following drawings in which like reference numerals refer to like parts throughout and in which.

DETAILED DESCRIPTION OF THE PREFERRED EMBODIMENTS

Figure 1:
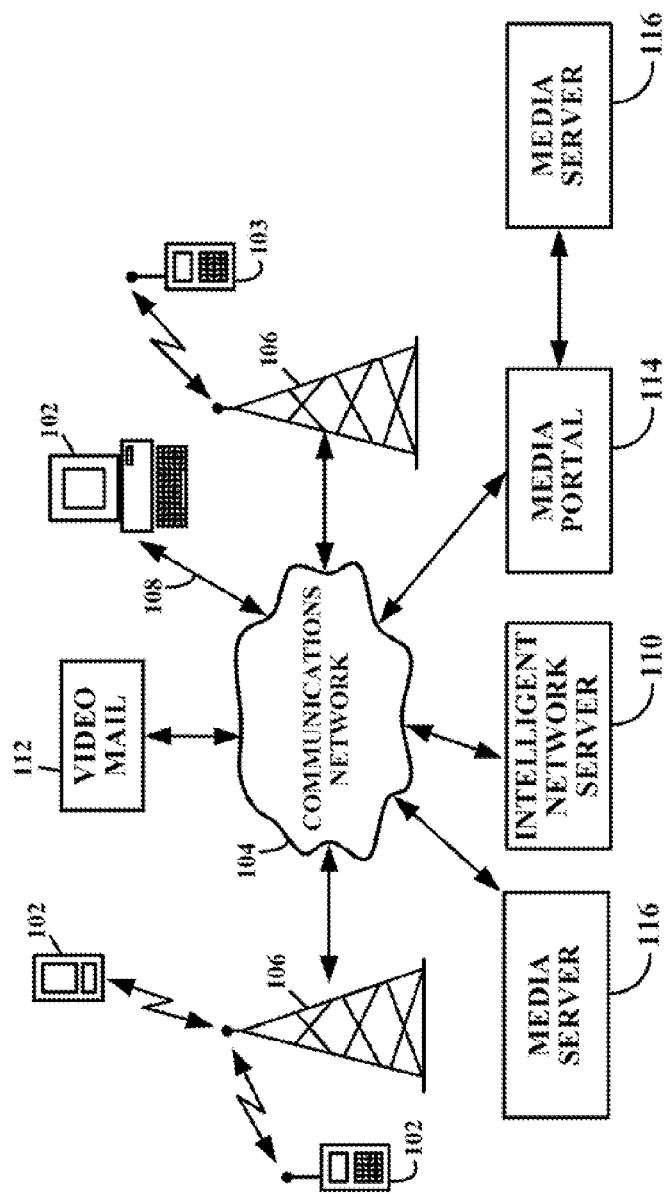
FIG. 1 is a block diagram of a communication system in accordance with certain embodiments of the present invention.

Turning to FIG. 1, a communication system 100 is shown. As illustrated, system 100 includes a plurality of multimedia devices 102. Multimedia devices 102 may be any devices suitable for producing and delivering multimedia content, such a 3G mobile telephone, a personal digital assistant (PDA), a personal computer, etc. Devices 102 may be connected to communication networks 104 via and suitable wireless connections 106 or wired connections 108. Communications networks 104 may include any combination of known communication networks including wired telephone networks, wireless telephone networks, the Internet, cable television networks, satellite communication networks, wireless computer networks, private computer networks, etc., which may include any combination of circuit switched and packet switch networks.

As also shown in FIG. 1, system 100 may also include one or more non-multimedia devices 103, intelligent network servers 110, video mail systems 112, media portals 114, and media servers 116. Non-multimedia devices 103 may be any suitable non-multimedia devices such as wired telephones, cordless telephones, cellular telephones, etc. Intelligent network servers 110 may be servers or any suitable devices for controlling the operation of multimedia devices 102. For example, when placing a telephone call from a multimedia device 102, a server 110 may direct the telephone call from one device 102 to another device 102 or to a video mail system 112. As another example, when a multimedia device 102 requests streaming media, such as a television program, a server 110 may direct the request to a media portal 114, which may then direct the request to a media server 116. Media portals 114 may be any suitable devices for enabling users of multimedia devices 102 to connect to media portals 114 and request content or select from available content provided by the medial portals 114 and/or media servers 116 connected to (or part of) the portals 114 or communication networks 104.

Figure 2:
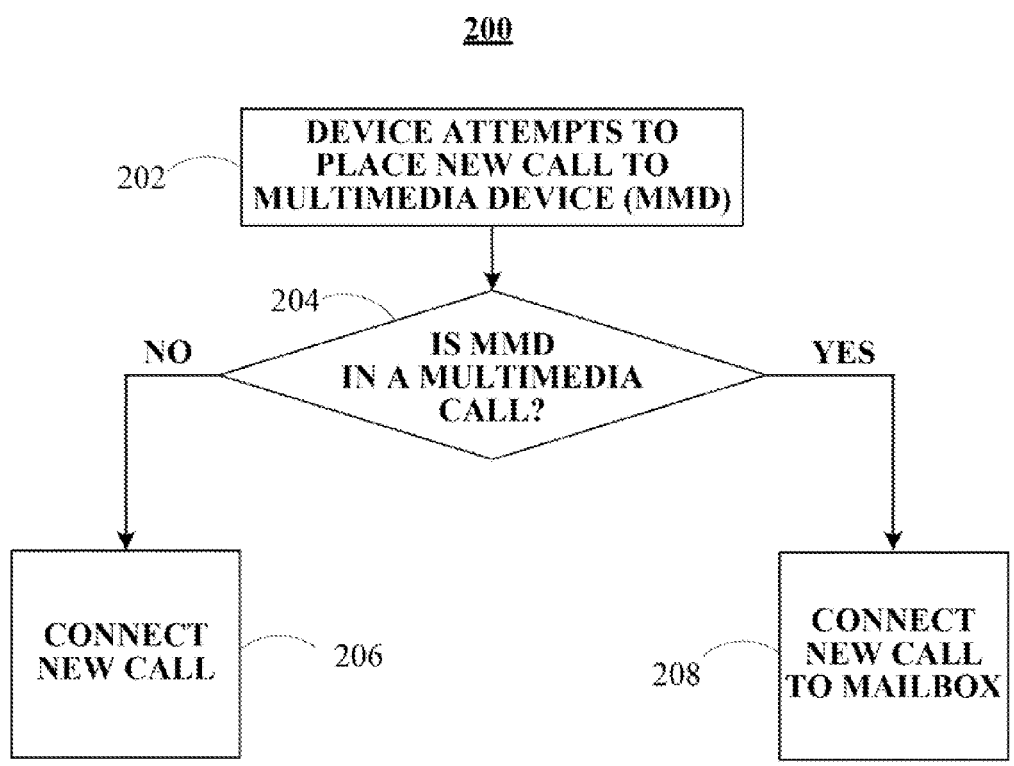
FIG. 2 is a flow chart of a prior art process for handling calls to multimedia devices.
Figure 3:
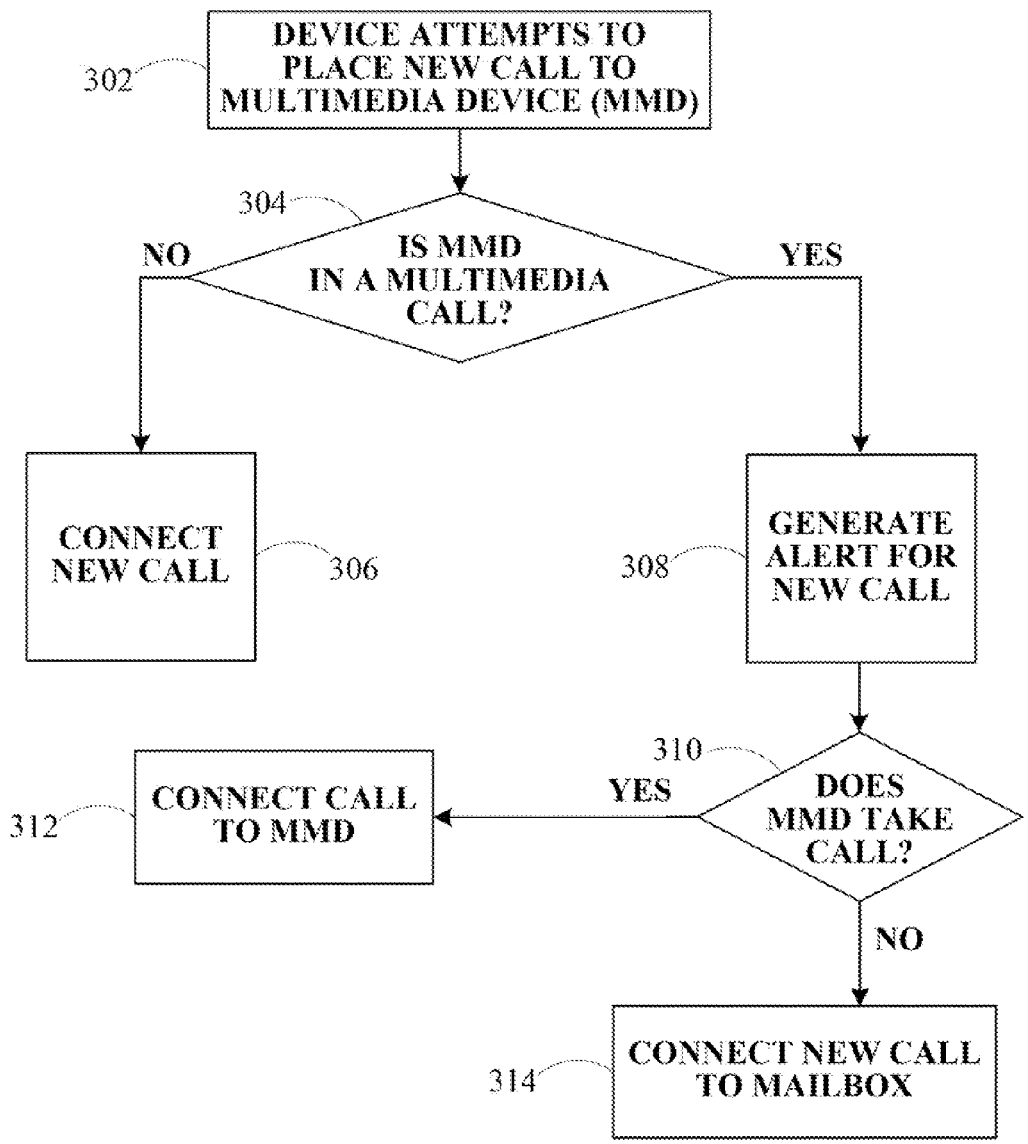
FIG. 3 is a flow chart of a process for handling calls to multimedia devices in accordance with certain embodiments of the present invention.

A prior art process 200 for handling multimedia calls is shown in FIG. 2. As illustrated, at step 202, a caller attempts to place a new call, i.e., a multimedia call or non-multimedia call, to a multimedia device. The communications network may then determine whether the target multimedia device (MMD) is in a multimedia call at step 204. If it detects that the target MMD is not in a multimedia call, process 200 proceeds to alert the target MMD and, if accepted, connect the new call to the multimedia device at step 206. Otherwise, process 200 proceeds to connect the new call to a mail system so that the user can leave a mail message.

As is apparent from FIG. 2, prior art processes, such as process 200, for connecting new calls did not alert the target multimedia device user to the incoming call using a call-waiting alert when that target multimedia device was on a multimedia call. Rather, the caller was instead connected directly to a mail system. The reason for this is that multimedia devices, while in a multimedia call, unlike when in a voice-only call, are only capable of maintaining a single connection at any given time.

In accordance with the present invention, a process 300 for connecting new calls to multimedia devices is provided. As shown, at step 302, a caller places a new call to a multimedia device. As used herein, a new call could be from a user requesting to place a voice-only or video-and-voice telephone call, or could be from an automated system that is attempting to contact a user to deliver some content (e.g., a video mail message, a video news flash, etc.). Next, process 300 proceeds to step 304 at which the INS determines whether the target multimedia device is busy with a multimedia call. If the target device is not busy, process 300 proceeds to step 306 at which the call is connected. Otherwise, process 300 proceeds to step 308 at which the INS connects the call to the media portal, which provides a call waiting alert to the first multimedia device as part of, or in place of, the multimedia already being delivered to the first multimedia device. This alert may be any suitable notification, such as a tone, a video overlay, etc. Next, at step 310, the media portal may determine whether the target device has indicated that the call will be taken. If so, then process 300 proceeds to step 312 at which media portal connects the call. If necessary, the media portal may convert a traditional voice-only call to a multimedia call to effect the connection between the caller and the first multimedia device. Otherwise, process 300 proceeds to step 314 at which the call may be connected to a mail system.

Process 300 can be further illustrated with an example. Assume that a first user of a first multimedia device 102 wishes to receive a streaming broadcast of a football match from a media server 116. The first multimedia device 102 would be connected through a media portal 114 to the media server. Assume that while the first user is watching the football match, a second user using a second device 102 or 103 wishes to place a call to the first user on the first multimedia device 102, and that the first user elects to take the call. Process 300 would detect that the second device 102 or 103 is attempting to place a call at step 302, detect that the first device 102 is busy in a multimedia call at step 304, generate a call waiting alert on first device 102 at step 308, determine whether the first user wants to be connected to the call at step 310, and finally connect the call by performing step 314.

Thus, as can be seen, in accordance with the present invention, systems and methods for providing a call-waiting feature in multimedia devices are provided. Although the present invention has been illustrated by way of specific examples, it will be apparent to one of ordinary skill in the art that the present invention may be implemented with various modifications from the preferred embodiment described herein and that the scope of the invention is limited only by the claims that follow.

What is claimed is:

1. A method of implementing call waiting in a multimedia communications network, comprising:
routing a first multimedia call between a first multimedia device and a second device through a network server, wherein the multimedia communications network directs the first multimedia device to a media portal that provides multimedia content for the first multimedia call and wherein the first multimedia device maintains a single connection during the first multimedia call and cannot open additional multimedia connections during the first multimedia call;
detecting that a third device is attempting to place a call to the first multimedia device, wherein the network server determines that the first multimedia device is engaged in the first multimedia call with the second device and wherein the multimedia communications network is configured to direct the third device to a mail server in response to the determination;
prior to the third device being directed to the mail server, rerouting the call from the third device to the network server in response to detecting that the first multimedia device is engaged in the first multimedia call;
using the network server to connect the call to the media portal that is providing the multimedia content for the first multimedia call in order to configure a call waiting capability of the first multimedia device;
generating a call-waiting alert at the media portal in response to detecting that the first multimedia device is engaged in the first multimedia call with the second device and in response to detecting that the third device is attempting to place the call to the first multimedia device, wherein the media portal incorporates the call-waiting alert within the multimedia content provided during the first multimedia call;
providing the call-waiting alert to the first multimedia device from the media portal over the single connection through the multimedia communications network;
using the media portal to determine whether the call has been accepted through the provided call-waiting alert; and
using the media portal to convert the call to a second multimedia call in response to determining that the first multimedia device has accepted the call through the provided call-waiting alert.

2. The method of claim 1, further comprising connecting the call from the third device to a mail system.

3. The method of claim 1, further comprising connecting the third device to the network server.

4. A system for implementing call waiting in a multimedia communications network, the system comprising:
a server connected to the multimedia communications network and configured to control connection of calls between at least a first multimedia device, which sends and receives multimedia calls and multimedia content, and a second device, wherein the server is configured to:
route a first multimedia call between a first multimedia device and a second device through a network server, wherein the multimedia communications network directs the first multimedia device to a media portal that provides the multimedia content for the first multimedia call and wherein the first multimedia device maintains a single connection during the first multimedia call and cannot open additional multimedia connections during the first multimedia call;
detect that a third device is attempting to place a call to the first multimedia device, wherein the network server determines that the first multimedia device is engaged in the first multimedia call with the second device and wherein the multimedia communications network is configured to direct the third device to a mail server in response to the determination;

prior to the third device being directed to the mail server, reroute the call from the third device to the network server in response to detecting that the first multimedia device is engaged in the first multimedia call;

use the network server to connect the call, to the media portal that is providing the multimedia content for the first multimedia call in order to configure a call waiting capability of the first multimedia device;

generate a call-waiting alert at the media portal in response to detecting that the first multimedia device is engaged in the multimedia call with the second device and in response to detecting that the third device is attempting to place a call to the first multimedia device, wherein the media portal incorporates the call-waiting alert within the multimedia content provided during the multimedia call;

provide the call-waiting alert to the first multimedia device from the media portal over the single connection through the multimedia communications network;

use the media portal to determine whether the call has been accepted through the provided call-waiting alert; and use the media portal to convert the call to a second multimedia call in response to determining that the first multimedia device has accepted the call through the provided call-waiting alert.

5. The system of claim 4, wherein the third device connects to the first multimedia device through the media portal.

6. The system of claim 4, further comprising a mail system to which the call from the third device is connected by the media portal.

7. The system of claim 4, wherein the third device is connected to the network server.

8. The method of claim 1, further comprising accepting a response from the first multimedia device, following receipt of the call-waiting alert, indicative of whether a user desires to accept the call from the third device.

9. The method of claim 8, further comprising connecting the call from the third device to the first multimedia device through the network server, if the response indicates that the user desires to accept the call from the third device.

10. The method of claim 8, further comprising connecting the call from the third device to a mail system, if the response indicates that the user does not desire to accept the call from the third device.

11. The system of claim 4, wherein the server is further configured to connect the call from the third device to the first multimedia device through the network server in response to receiving a response from the first multimedia device.

* * * * *